(12) United States Patent
Coursimault

(10) Patent No.: US 9,468,809 B2
(45) Date of Patent: Oct. 18, 2016

(54) DEVICE FOR ATTACHING TWO MECHANICAL CONNECTORS

(71) Applicant: ZEDEL, Crolles (FR)

(72) Inventor: Antoine Coursimault, Revel (FR)

(73) Assignee: ZEDEL, Crolles (FR)

( * ) Notice: Subject to any disclaimer, the term of this patent is extended or adjusted under 35 U.S.C. 154(b) by 24 days.

(21) Appl. No.: 14/595,674

(22) Filed: Jan. 13, 2015

(65) Prior Publication Data

US 2015/0202496 A1    Jul. 23, 2015

(30) Foreign Application Priority Data

Jan. 22, 2014 (FR) ...................................... 14 00121

(51) Int. Cl.
*A63B 29/02* (2006.01)
*A63B 27/00* (2006.01)
*F16B 45/02* (2006.01)

(52) U.S. Cl.
CPC ............... *A63B 29/02* (2013.01); *F16B 45/02* (2013.01); *Y10T 24/318* (2015.01)

(58) Field of Classification Search
CPC ...... A63B 29/02; F16B 45/02; Y10T 24/318
See application file for complete search history.

(56) References Cited

U.S. PATENT DOCUMENTS

| | | | | |
|---|---|---|---|---|
| 4,817,551 A | * | 4/1989 | Matson | B63B 21/00 114/230.15 |
| 5,005,266 A | * | 4/1991 | Fister | F16B 45/02 24/599.8 |
| 5,210,914 A | * | 5/1993 | Katsma | F16B 45/02 24/588.1 |
| 5,416,955 A | * | 5/1995 | Katsma | F16B 45/02 24/588.1 |
| 7,036,780 B1 | | 5/2006 | Geninatti | |
| D733,525 S | * | 7/2015 | Petzl | D8/349 |
| D741,145 S | * | 10/2015 | Petzl | D8/349 |
| D747,176 S | * | 1/2016 | Petzl | D8/349 |
| 2004/0115390 A1 | * | 6/2004 | Hess | A62B 35/04 428/99 |
| 2011/0061519 A1 | * | 3/2011 | Fields | A63B 29/02 87/2 |

FOREIGN PATENT DOCUMENTS

CH            688 573 A5    11/1997

* cited by examiner

*Primary Examiner* — Robert J Sandy
*Assistant Examiner* — Louis Mercado
(74) *Attorney, Agent, or Firm* — Oliff PLC

(57) ABSTRACT

An attachment device for attaching two mechanical connectors includes a strap and a protective enclosure. The strap includes opposite first and second ends folded so as to define first and second loops separated by a central part to which the first and second ends are secured, each loop being configured to allow a connector to pass. The protective enclosure includes main flanges and side flanges connected in a permanent manner, the main flanges covering main surfaces of the strap and the side flanges covering lateral surfaces of the central part so as to define a first closed loop forming a first opening around the first loop and a second closed loop forming a second opening around the second loop. Each opening is configured to allow passage of a connector, and at least one of the openings is configured to enable the strap to be inserted in the protective enclosure.

13 Claims, 2 Drawing Sheets

DEVICE FOR ATTACHING TWO MECHANICAL CONNECTORS

BACKGROUND OF THE INVENTION

The invention relates to an attachment device for attaching two mechanical connectors used in mountain sports.

STATE OF THE ART

In mountain sports such as rock climbing or mountaineering, it is very common to have recourse to devices for attaching two connectors. For example, when he is lead climber, a user uses quickdraws to connect a rope to different anchoring points on a rock face (hangers, clamps, friends, ice screws, etc.).

Quickdraws comprise two connectors such as snap-hooks, connected by a strap. The latter comprise a first end, a central part and a second end, the first and second ends being folded and sewn at the level of the central part. A first loop and a second loop are located on each side of this sewn area, each loop being configured to allow a connector to pass through. Mechanical connection between the two carabiners is ensured by the strength of the strap and of the stitching.

For the user to be able to progress in complete safety when he is climbing, it is of prime importance for the strap to be in good condition and not to present any unstitched or torn-off portions. However, when the wall on which the user is climbing is made from a very abrasive material, for example indoors, or when there is a lot of pull when climbing outdoors, the strap wears very quickly.

OBJECT OF THE INVENTION

One object of the invention is to propose an attachment device for attaching two connectors having an enhanced abrasion resistance and a longer lifetime.

For this purpose, the attachment device comprises:
a strap comprising opposite first and second ends folded so as to define first and second loops separated by a central part on which the first and second ends are secured, each loop being configured to allow a connector to pass,
a monoblock protective enclosure comprising main flanges and side flanges connected in permanent manner, the main flanges covering main surfaces of the strap, and the side flanges covering lateral surfaces of the central part, so as to define a first opening around the first loop, and a second opening around the second loop, each opening being configured to allow passage of a connector, at least one of the openings being configured to enable the strap to be inserted in the protective enclosure.

The strength of the strap can advantageously be greater than the strength of the protective enclosure in a longitudinal direction of the strap joining the first loop to the second loop.

According to one embodiment, the monoblock protective enclosure can comprise apertured side flanges in the central part and can be made from a transparent material.

Furthermore, the first loop can have a smaller cross-section than the second loop, and the first opening can have a smaller cross-section than the second opening.

The first and second openings can also comprise mechanical strengthening means and for example form a reinforcement of the protective enclosure.

The external shape of the strap can furthermore be complementary to the shape of the inside of the protective enclosure.

Finally, the attachment device can comprise a connector, and the protective enclosure can comprise a blocking part configured to prevent movements of the connector relatively to the strap and to the protective enclosure.

BRIEF DESCRIPTION OF THE DRAWINGS

Other advantages and features will become more clearly apparent from the following description of particular embodiments of the invention given for non-restrictive example purposes only and represented in the appended drawings, in which.

DETAILED DESCRIPTION

Figure 1:
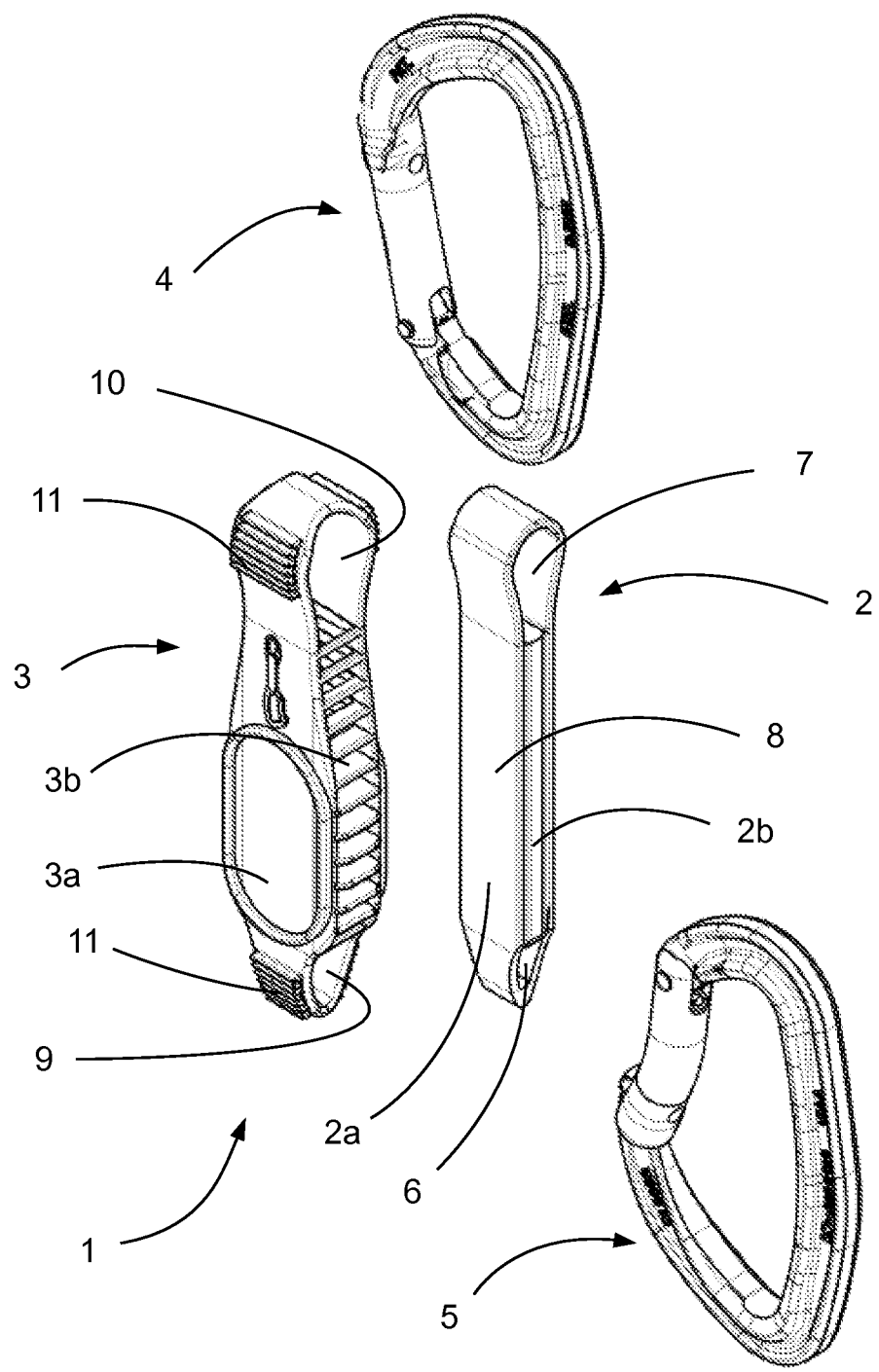
FIG. 1 is an exploded view of the attachment device for attaching two mechanical connectors according to one embodiment.

Attachment device 1 comprises a strap 2 and a protective enclosure 3 configured to join two mechanical connectors 4 and 5. Connectors 4 and 5 advantageously have an annular shape and can for example be carabiners, snap-hooks, quick links, etc.

Strap 2 is made from a flexible material such as polyamide, polyester, or high-modulus polyethylene, for example dyneema®. Strap 2 comprises first and second ends which are folded so as to define first and second loops 6 and 7 separated by a central part 8 on which the first and second ends are secured.

According to one embodiment, the first and second ends can be folded on one another and sewn to central part 8 so as to have a triple thickness of strap 2 in this area. It can also be envisaged to secure the first and second ends of strap 2 in juxtaposed manner on central part 8.

The quality of securing of the different parts of strap 2 is of paramount importance to ensure that attachment device 1 has a good mechanical strength in the longitudinal direction A-A, thereby ensuring user safety.

Furthermore, first and second loops 6 and 7 are advantageously configured to enable the passage of connectors 4 and 5. First and second loops 6 and 7 therefore present a minimum diameter ensuring that connectors 4 and 5 are able to pass through.

Protective enclosure 3 is for its part monoblock and comprises main flanges 3a and side flanges 3b connected in permanent manner. This property ensures that contacts between strap 2 and the wall on which attachment device 1 is positioned are prevented. Protective enclosure 3 consequently defines a cavity which laterally holds strap 2 captive to prevent any nuisance egress of the latter.

The role of protective enclosure 3 is to protect strap 2 in order to limit its abrasion. Its mechanical strength is not designed to ensure user safety, for example in case of a fall when the latter is lead climber.

The strength of strap 2 in the longitudinal direction A-A is therefore greater than the strength of protective enclosure 3 in this same direction.

The shape of the inside of protective enclosure 3 is designed to match the shape of strap 2. Advantageously, the shape of strap 2 is complementary to the shape of the cavity in protective enclosure 3 in order to reduce the movements of strap 2 inside protective enclosure 3.

When attachment device 1 is assembled, main flanges 3a of protective enclosure 3 cover main surfaces 2a of strap 2, and side flanges 3b of protective enclosure 3 cover lateral surfaces 2b of strap 2 so as to define a first opening 9 around first loop 6 and a second opening 10 around second loop 7. The dimensions of each opening 9 and 10 are designed to enable passage of connectors 4 and 5.

The shapes of loops 6 and 7 and of openings 9 and 10 are preferably complementary in a longitudinal cross-section A-A (cf. FIG. 2), so that it is difficult to place connectors 4 and 5 between protective enclosure 3 and strap 2.

Figures 2, 3:
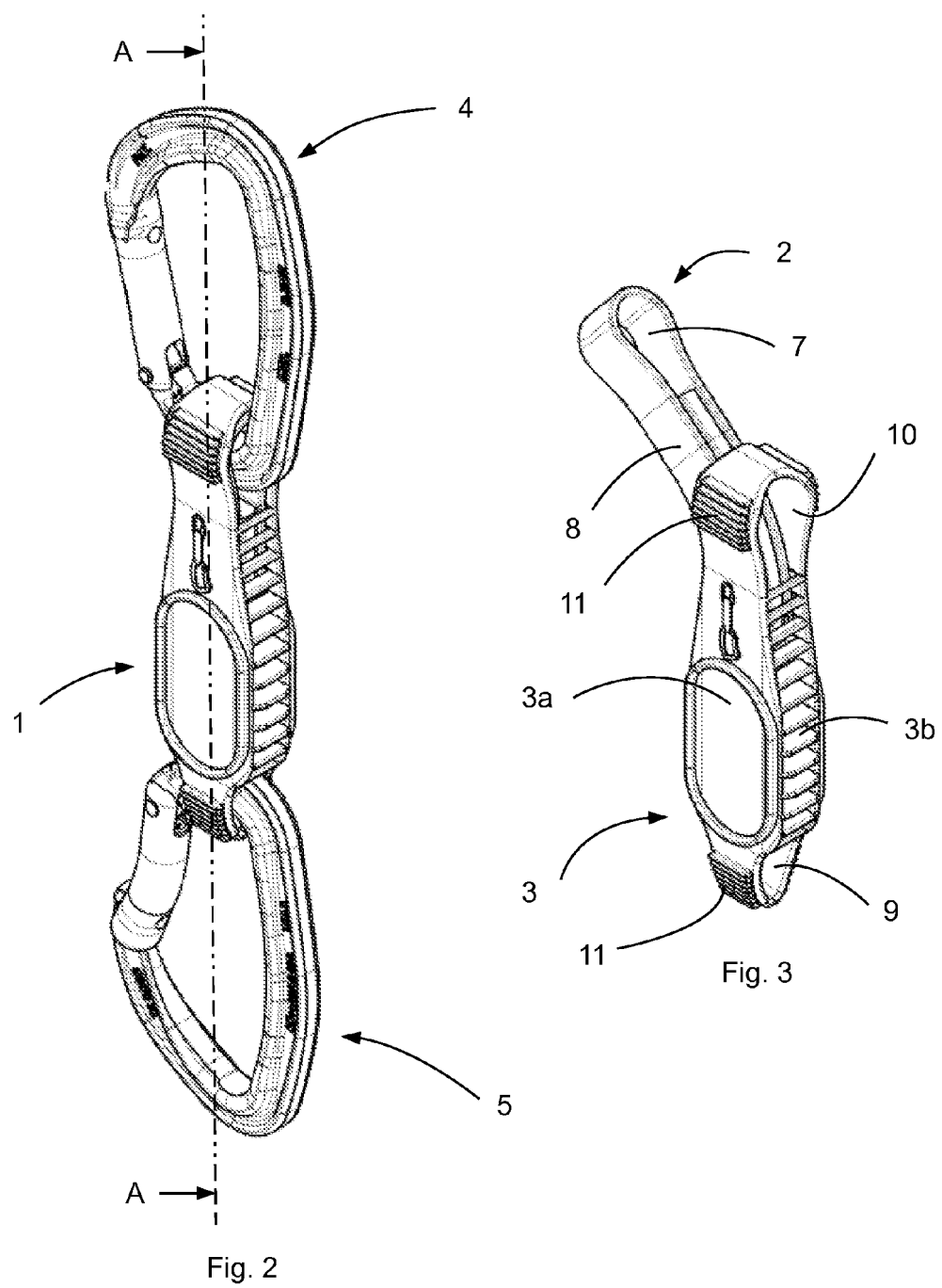
FIG. 2 represents the attachment device according to the embodiment of FIG. 1 when the different parts are assembled.
FIG. 3 illustrates the assembly method of the parts of an attachment device according to the embodiment of FIG. 1.

Furthermore, at least one of openings 9 or 10 is configured to enable insertion of strap 2 in protective enclosure 3, as represented in FIG. 3. Insertion of strap 2 in protective enclosure 3 is made possible due to the flexibility of strap 2.

In the embodiment illustrated in the appended figures, opening 10 is larger than opening 9 to facilitate insertion of strap 2. Strap 2 then simply has to be pushed into protective enclosure 3 to perform assembly of attachment device 1.

The fact that strap 2 can be removed from protective enclosure 3 in particular presents the advantage of enabling regular checking of the state of strap 2 and of replacing it if required.

According to a particular embodiment, first and second loops 6 and 7 of strap 2 may not have the same dimensions. This enables movements of one of the connectors with respect to the other to be limited.

It is for example particularly advantageous to place a connector that is mobile with respect to attachment device 1 on the rock face and to place the rope in a connector having a position which is more stable with respect to attachment device 1. In this way, when the user passes beyond the point at which it is attached to the rock face, attachment device 1 pivots easily along the connector fixed to the rock face and the friction between attachment device 1 and rock face is limited.

In the embodiment illustrated in the figures, first loop 6 is smaller than second loop 7. It is advantageously placed at the level of opening 9 which is smaller than opening 10. In this way, opening 9 also participates in stabilising connector 5 with respect to attachment device 1.

The user can then advantageously attach connector 4 to the rock face, connector 4 being mobile with respect to attachment device 1, and place the rope inside connector 5, which only has a limited mobility with respect to attachment device 1.

According to a particular embodiment, it can be provided for a blocking part (not represented) to be positioned at the location of the smaller of the openings of protective enclosure 3 to hamper movements of the connector passing through it even more. When the connector is inserted in the loop and in the opening, the blocking part therefore deforms to limit movement of the connector, preferably the connector associated with the smaller of the loops.

The blocking part can for example be a part configured to reduce the dimensions of the smaller of the openings. It can be a part configured to partially close the smaller of the openings, or an extra thickness inside the smaller of the openings to reduce the cross-section of the latter.

To guarantee the flexibility of protective enclosure 3, the latter is made from a plastic material such as thermoplastic polyurethane, a material which is very abrasion-resistant.

The latter is advantageously transparent to be able to easily check the state of strap 2 without having to remove the protective enclosure.

According to an advantageous embodiment illustrated in the figures, side flanges 3b of protective enclosure 3 may be apertured in order to improve the torsion properties of attachment device 1. It is however preferable for the thickness of side flanges 3b to be sufficient to prevent deterioration of strap 2 by friction when attachment device 1 is used. Here, the thickness of side flanges 3b is about equal to half of the width of the main surfaces of strap 2. Having apertured side flanges 3b also makes it easier to check wear or drying of strap 2.

When an attachment device 1 such as a quickdraw is used, abrasion of strap 2 is rapid at the location of loops 6 and 7 through which connectors 4 and 5 pass. It is therefore important to protect loops 6 and 7 efficiently.

For this, the outer surface of loops 6 and 7 is covered by protective enclosure 3 and the inside of each loop is filled by a connector 4 or 5, which presses the loop against protective enclosure 3. This configuration limits the movement of loops 6 and 7 in protective enclosure 3, which makes it possible to reduce the wear of the strap in the event of abrasive impurities getting into strap 2 and protective enclosure 3.

The latter are advantageously protected by means of openings of protective enclosure 3. However, to improve the protection of strap 2, at least one of the openings can be provided with a mechanical strengthening means, in particular the opening through which the connector which is attached to the rock face passes, as this is the part of strap 2 which is the most subject to friction.

In the illustrated embodiment, the two openings 9 and 10 comprise mechanical strengthening means, and more precisely reinforcements 11 such as ribs.

A device is thus provided which is efficient, simple to produce, and particularly suitable for uses in rock climbing or mountaineering when attachment device 1 is in contact with very abrasive materials.

The invention claimed is:

1. An attachment device for attaching two mechanical connectors, the attachment device comprising:
   a strap comprising opposite first and second ends folded so as to define first and second loops separated by a central part with main surfaces to which the first and second ends are secured, each loop being configured to allow a connector to pass; and
   a monoblock protective enclosure comprising main flanges and side flanges connected in a permanent manner, wherein:
   the main flanges cover main surfaces of the central part and the side flanges cover lateral surfaces of the central part so as to define a first closed loop forming a first opening extending over the first loop and a second closed loop forming a second opening extending over the second loop,
   each of the openings is configured to allow passage of a connector, and
   at least one of the openings is configured to enable the strap to be inserted in the protective enclosure.

2. The attachment device according to claim 1, wherein a mechanical strength of the strap is greater than a mechanical strength of the protective enclosure in a longitudinal direction of the strap connecting the first loop to the second loop.

3. The attachment device according to claim 1, wherein the protective enclosure comprises aperture side flanges at the central part.

4. The attachment device according to claim 1, wherein the protective enclosure is made from a transparent material.

5. The attachment device according to claim 1, wherein the first loop has a smaller cross-section than the second loop, and wherein the first opening has a smaller cross-section than the second opening.

6. The attachment device according to claim 1, wherein at least one of the first and second openings comprises a strengthening stucture.

7. The attachment device according to claim 6, wherein the strengthening structure is a reinforcement of the protective enclosure.

8. The attachment device according to claim 1, wherein the external shape of the strap is complementary to an inside shape of the protective enclosure.

9. The attachment device according to claim 1, further comprising a connector, wherein the protective enclosure comprises a blocking part configured to prevent movements of the connector relative to the strap and to the protective enclosure.

10. The attachment device according to claim 1, wherein the strap and the protective enclosure have substantially a same length.

11. The attachment device according to claim 1, wherein at least one of the first and second openings faces a direction substantially perpendicular to a longitudinal direction of the strap connecting the first loop and the second loop.

12. The attachment device according to claim 1, wherein the first and second closed loops of the protective enclosure extend past the side flanges in a longitudinal direction of the strap connecting the first loop and the second loop.

13. The attachment device according to claim 1, wherein the strap and the protective enclosure are arranged so that a single connector can simultaneously pass through the first loop of the strap and the first opening.

* * * * *